No. 860,273. PATENTED JULY 16, 1907.
A. A. WARNER.
PERCOLATOR.
APPLICATION FILED APR. 4, 1907.

Witnesses.
S. H. Clarke
P. J. Egan

Inventor.
Alonzo A. Warner.
By James Shepard
Atty.

UNITED STATES PATENT OFFICE.

ALONZO A. WARNER, OF NEW BRITAIN, CONNECTICUT, ASSIGNOR TO LANDERS, FRARY AND CLARK, OF NEW BRITAIN, CONNECTICUT, A CORPORATION.

PERCOLATOR.

No. 860,273.   Specification of Letters Patent.   Patented July 16, 1907.

Application filed April 4, 1907. Serial No. 366,285.   REISSUED

*To all whom it may concern:*

Be it known that I, ALONZO A. WARNER, a citizen of the United States, residing at New Britain, in the county of Hartford and State of Connecticut, have invented certain new and useful Improvements in Percolators, of which the following is a specification.

My invention relates to improvements in percolators, and the object of my improvement is to improve the efficiency of the spreader upon which the liquid falls from the fountain tube, by a construction that compels the liquid to pass through the said spreader in drops, no matter how full of liquid the spreader may be.

Figure 1:
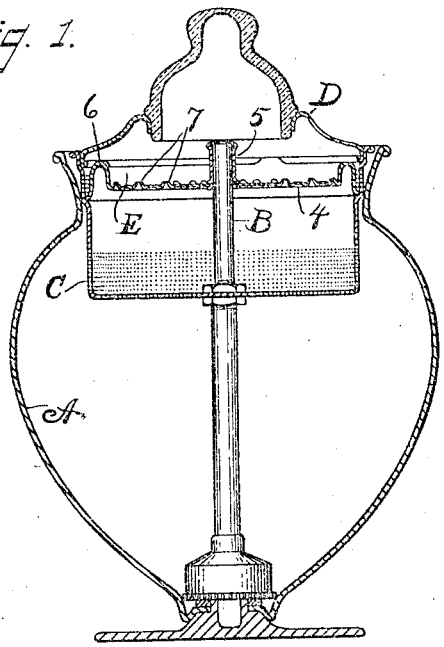
Figure 2:
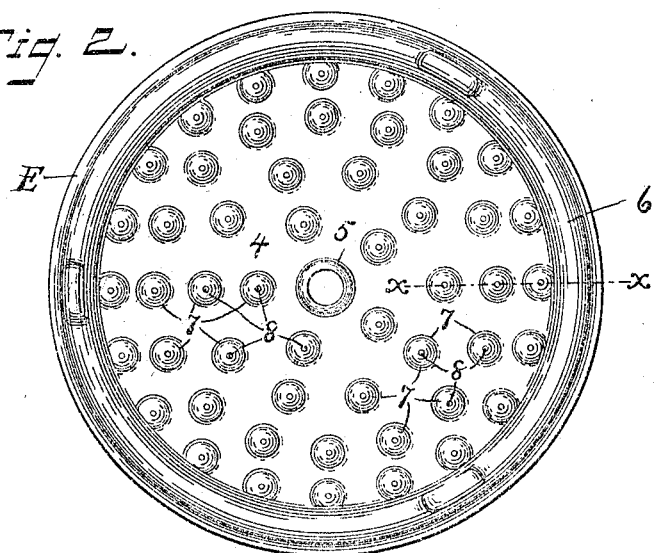
Figure 3:
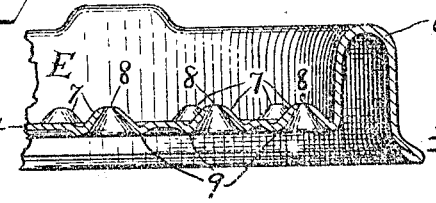

In the accompanying drawing:—Figure 1 is a central vertical section of a percolator with my improved spreader in the drip cup, the fountain tube of the said percolator being shown in side elevation. Fig. 2 is an enlarged plan view of the spreader, and—Fig. 3 is a still further enlarged sectional view of a portion of the spreader on the line $x$ $x$ of Fig. 2.

The percolator vessel A, its fountain tube B with connected parts, the drip cup C and the cover D may be of any ordinary construction. In the upper part of the drip cup, above the ground coffee or other material for the percolator to act upon, is the spreader or retainer E. It is provided with a spreader plate 4, a central tube 5 mounted on the said spreader plate, to receive the upper end of the fountain tube B, and with a raised rim 6 to compel the liquid that falls on the spreader plate from the fountain tube to pass through the said plate or flow over the rim thereof.

The parts thus far described are older than the invention which is the subject matter of this application, although as shown they are largely of my invention.

Heretofore this and similar retainers have had their spreader plates in the form of strainers, one form of which is shown in my Patent No. 821,445, dated May 22, 1906. In my present improvement the perforated or spreader plate 4 at bottom of the retainer is provided with a series of upwardly projecting hollow cones 7 each of which is provided with a perforation 8 preferably at the apex as best shown in the enlarged sectional view Fig. 3. These are formed by striking up from the metal of the plate 4 and I prefer in each case to form a slight annular rim 9 on the under side of the spreader plate and around the base of each hollow cone to prevent a lateral flow of the liquid.

In a percolator of the above construction the liquid that falls on the spreader plate within the retainer or spreader, works through the perforations 8, collects within the hollow cones and falls therefrom in large drops and never in a continuous stream, no matter how full the retainer may be. In view of this fact, the rim or overflow 6 around the edge of my spreader plate may be made higher than heretofore, because a body of liquid on the top of the plate does not cause the liquid to discharge in streams. The ordinary spreader plates with a simple strainer are made shallow so that they cannot contain such a depth of liquid as would increase the tendency to force the liquid through the plate in streams. The hollow cones also act to separate the discharge from the different perforations, so that the discharge from two or more perforations will never unite on the under side of the plate, as that from several perforations will run together on the underside of a spreader plate having a simple strainer, as in my aforesaid patent. The percolating effect of the liquid thus falling in drops upon the ground coffee or other material in the drip cup, is believed to be more efficient than would be the same amount of liquid passing therethrough in a continuous stream, besides distributing the material over a larger surface of the spreader plate than it would be distributed if the liquid passed through in a stream or streams. It also distributes the liquid more evenly than it can be distributed when the discharge from several perforations run together on the underside of the spreader plate before falling, no matter whether it falls in drops or streams.

I claim as my invention:

1. In a percolator, the combination of a drip cup and fountain tube with a retainer or spreader having a spreader plate in the upper part of the drip cup to receive the liquid that falls from the fountain tube, the said spreader plate having a series of upwardly projecting hollow cones, perforated to admit the liquid into the interior of the said hollow cones.

2. In a percolator, the combination of a drip cup and fountain tube, with a retainer having a spreader plate in the upper part of the drip cup, the said spreader plate being formed of sheet metal with a series of upwardly projecting struck up hollow cones, perforated for the admission of liquid thereto, and a depending annular rim around the base of the said hollow cones on the underside of the said spreader plate.

ALONZO A. WARNER.

Witnesses:
W. E. EASTMAN,
B. F. WILLIAMS.